United States Patent
Khan et al.

(10) Patent No.: US 7,945,718 B2
(45) Date of Patent: May 17, 2011

(54) MICROCONTROLLER WAVEFORM GENERATION

(75) Inventors: Ata Khan, Saratoga, CA (US); Greg Goodhue, San Jose, CA (US); Pankaj Shrivastava, San Jose, CA (US)

(73) Assignee: NXP B.V., Eindhoven (NL)

( * ) Notice: Subject to any disclaimer, the term of this patent is extended or adjusted under 35 U.S.C. 154(b) by 73 days.

(21) Appl. No.: 12/064,375

(22) PCT Filed: Aug. 22, 2006

(86) PCT No.: PCT/IB2006/052904
§ 371 (c)(1),
(2), (4) Date: Dec. 1, 2008

(87) PCT Pub. No.: WO2007/023456
PCT Pub. Date: Mar. 1, 2007

(65) Prior Publication Data
US 2009/0254691 A1    Oct. 8, 2009

Related U.S. Application Data

(60) Provisional application No. 60/710,652, filed on Aug. 22, 2005.

(51) Int. Cl.
*G06F 13/00* (2006.01)
*G06F 3/00* (2006.01)
*G06F 5/00* (2006.01)
*G06F 19/00* (2006.01)
*G06F 1/02* (2006.01)

(52) U.S. Cl. .............. 710/100; 710/7; 710/58; 710/60; 710/61; 702/124; 702/125; 708/270; 708/272

(58) Field of Classification Search .......... 710/100, 710/22, 25, 7, 58, 60, 61; 702/124, 125; 708/270, 272
See application file for complete search history.

(56) References Cited

U.S. PATENT DOCUMENTS

| | | | | |
|---|---|---|---|---|
| 4,208,626 A | * | 6/1980 | Gregg, Jr. .................. | 324/76.15 |
| 4,406,627 A | * | 9/1983 | Winthrop et al. ............ | 434/219 |
| 4,418,388 A | * | 11/1983 | Allgor et al. .................... | 701/99 |
| 4,584,658 A | * | 4/1986 | Ottobre et al. ................ | 708/276 |
| 4,685,114 A | * | 8/1987 | Welling ........................ | 375/238 |
| 4,734,677 A | * | 3/1988 | Cake et al. .................... | 341/122 |

(Continued)

FOREIGN PATENT DOCUMENTS

JP    61260171 A    * 11/1986

(Continued)

OTHER PUBLICATIONS

Gangele et al., "ISRO's programmable digital waveform generator", Jun. 2008, IEEE, Aerospace and Electronic Systems Magazine, vol. 23, No. 6, pp. 25-30.*

(Continued)

*Primary Examiner* — Faisal M Zaman

(57) ABSTRACT

One embodiment of the present invention is a microcontroller (24) including an embedded memory (42), waveform control circuitry (44) operatively coupled to the memory (42), several terminals (52), and a programmable processor (30). Processor (30) is responsive to execution of the first sequence of instructions to store a waveform bit pattern in memory (42) with a desired transmission timing. Waveform circuitry (44) is responsive to processor (30) to control transmission of the waveform bit pattern stored in memory (42) through one or more of the terminals (52) in accordance with the timing while processor (30) executes the second sequence of instructions to perform a different process.

17 Claims, 2 Drawing Sheets

U.S. PATENT DOCUMENTS

| | | | | |
|---|---|---|---|---|
| 4,745,566 | A | * | 5/1988 | Ciardi ............................ 708/270 |
| 4,791,384 | A | | 12/1988 | Mackey et al. |
| 4,819,186 | A | * | 4/1989 | Ohta et al. ..................... 345/440 |
| 4,956,798 | A | * | 9/1990 | Dinteman ..................... 708/273 |
| 5,001,660 | A | * | 3/1991 | Adcock et al. ................. 708/276 |
| 5,184,310 | A | * | 2/1993 | Takenouchi ................... 702/124 |
| 5,247,621 | A | | 9/1993 | Gulick |
| 5,319,151 | A | * | 6/1994 | Shiba et al. ..................... 84/603 |
| 5,519,343 | A | * | 5/1996 | Britz ............................ 327/106 |
| 5,550,451 | A | * | 8/1996 | Itoh et al. ..................... 318/811 |
| 5,728,961 | A | * | 3/1998 | Tamura ........................... 84/600 |
| 6,134,161 | A | * | 10/2000 | Taniguchi et al. ............. 365/201 |
| 6,161,117 | A | * | 12/2000 | Maesaki et al. ................ 708/272 |
| 6,559,791 | B1 | * | 5/2003 | Davidson ..................... 342/169 |
| 6,922,650 | B2 | * | 7/2005 | Sato ............................. 702/120 |
| 6,954,531 | B2 | * | 10/2005 | Sollins ......................... 379/418 |
| 7,202,709 | B2 | * | 4/2007 | Yoshida ....................... 327/106 |
| 7,209,151 | B2 | * | 4/2007 | Huang .......................... 345/690 |
| 7,480,066 | B2 | * | 1/2009 | Keithley et al. ............. 358/1.15 |
| 2003/0100980 | A1 | * | 5/2003 | Gruenewald et al. ........... 701/36 |
| 2003/0105609 | A1 | | 6/2003 | Conway et al. |

FOREIGN PATENT DOCUMENTS

| | | | | |
|---|---|---|---|---|
| JP | 04065685 | A | * | 3/1992 |
| JP | 05266121 | A | * | 10/1993 |
| JP | 11231021 | A | * | 8/1999 |

OTHER PUBLICATIONS

Pretzl, G., "Dynamic testing of high-speed A/D converters", Jun. 1978, IEEE, IEEE Journal of Solid-State Circuits, vol. 13, No. 3, pp. 368-371.*

Courteau et al., "A high-precision RF vector analyzer based on synchronous sampling", Apr. 1994, IEEE, IEEE Transactions on Instrumentation and Measurement, vol. 43, No. 2, pp. 306-310.*

Barnes, R.N., "A function generator using hybrid techniques", Mar. 1970, IEEE, Radio and Electronic Engineer, vol. 39, No. 3, pp. 153-160.*

\* cited by examiner

MICROCONTROLLER WAVEFORM GENERATION

The present invention relates to electronic devices, and more particularly, but not exclusively, relates to generation of waveforms with a microcontroller.

There is a frequent desire to generate sequential bit patterns with predictable timing and/or frequency with a microcontroller. Unfortunately, generation of such desired patterns as a direct consequence of Central Processing Unit (CPU) instruction execution is often impractical because of variation in CPU instruction timing, higher priority CPU tasks, asynchronous interrupt servicing, and the like. Indeed, the operating system and other overhead tasks of many microcontroller applications often preclude direct sequential bit pattern generation with the CPU.

Thus, there is an ongoing demand for further contributions in this area of technology.

One embodiment of the present invention is a unique electronic device for generating bit patterns. Other embodiments of the present invention include unique devices, methods, systems, and apparatus to generate waveforms with a microcontroller.

A further embodiment includes providing a microcontroller integrated circuit that has a programmable processor, an embedded memory operatively coupled to the processor, waveform control circuitry operatively coupled to the processor and the memory, and several terminals for coupling to external circuitry. In accordance with programming executed by the processor, a waveform bit pattern is stored in the memory. The waveform circuitry controls synchronous transmission of the waveform bit pattern stored in the memory through one or more of the terminals in accordance with designated timing. During this transmission, an instruction sequence for a different process can be executed by the processor.

Still a further embodiment includes: providing a microcontroller integrated circuit having a programmable processor, an embedded memory, waveform control circuitry, and several input/output pins; executing a first instruction sequence with the processor; initiating transmission of a waveform bit pattern stored in the memory through one or more of the pins and controlling timing of the transmission; and executing a second instruction sequence with the processor during this transmission.

Yet another embodiment is directed to an apparatus comprising: a microcontroller integrated circuit device that includes an embedded memory, waveform control circuitry operatively coupled to the memory, several input/output pins, and a programmable processor. The input/output pins are each structured to be selectively switched between the memory and at least one different embedded device. The processor includes means for executing a first sequence of instructions to store a waveform bit pattern in the embedded memory and designate timing for the waveform bit pattern. The waveform circuitry includes means for controlling synchronous transmission of the waveform bit pattern stored in the memory through one or more of the input/output pins in accordance with the timing while the processor executes a second sequence of instructions to perform a different process.

One object of the present invention is to provide a unique electronic device for generating bit patterns.

Another object of the present invention is to provide a unique device, method, system, or apparatus to generate waveforms with a microcontroller.

Further objects, embodiments, forms, features, benefits, and advantages of the present invention shall become apparent from the description and figures included herewith.

Figure 1:
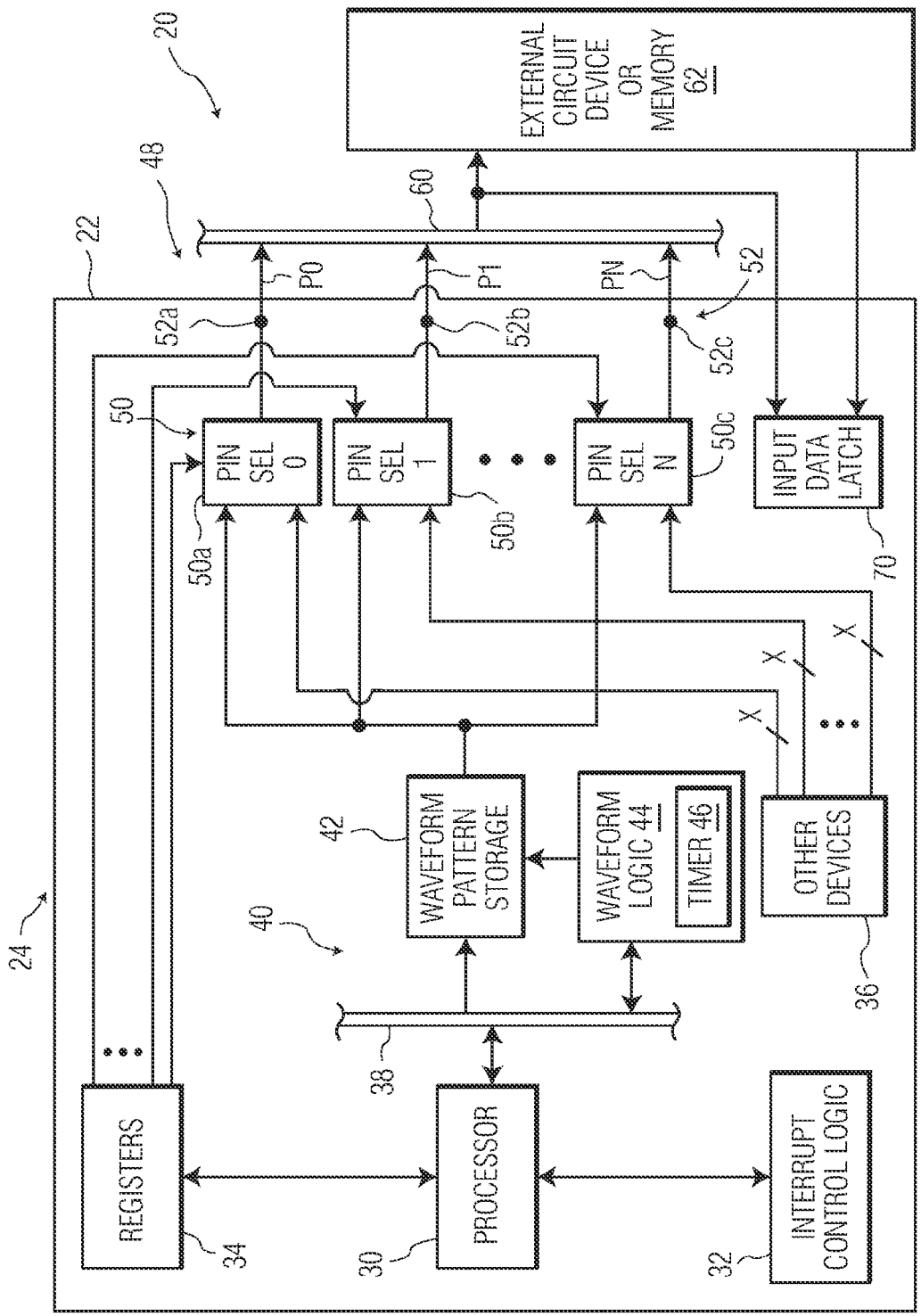
FIG. 1 is a diagrammatic view of a electronic device system.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is directed to a microcontroller integrated circuit including an embedded memory operatively coupled to the processor, waveform control logic operatively coupled to the memory, and a programmable processor. This processor executes a first process that includes storing a waveform bit pattern in the embedded memory with designated waveform transmission timing. Transmission of the waveform bit pattern from the memory through one or more terminals is performed under control of the waveform logic. The processor executes a different process as the transmission occurs.

FIG. 1 depicts another embodiment of the present invention in the form of electronic device system 20. System 20 includes microcontroller integrated circuit 22 that is of a solid state variety and may be manufactured using standard photolithographic techniques. Microcontroller circuit 22 defines microcontroller 24 that includes embedded circuitry operable to perform various microcontroller operations. This circuitry includes processor 30, interrupt control logic 32, input/output configuration registers 34, and other embedded devices 36. Processor 30 is of a programmable type that executes a sequence of instructions of a Complex Instruction Set Computing (CISC) type, a Reduced Instruction Set Computing (RISC) type, or different type as would occur to one skilled in the art. In one form, instructions are stored in memory coupled to processor 30 via a local bus. Such memory can include Static Random Access Memory (SRAM) memory, nonvolatile flash memory, Dynamic Random Access Memory (DRAM), and/or such different type as would occur to those skilled in the art.

Interrupt control logic 32 manages internal and external interrupts associated with microcontroller 24, and may be coupled to processor 30 by an appropriate internal bus.

Devices 36 include any of various standard input devices, output devices, Input/Output (I/O) devices, and/or different dedicated circuit devices. Devices 36 can include one or more timers, real-time clocks, analog-to-digital (A/D) converters, digital-to-analog (D/A) converters, Universal Asynchronous Receiver/Transmitter (UART) interfaces and/or various other serial communication ports, external interrupt pathways, pulse-width modulators, or the like, just to name a few. A high-speed internal bus can be used to couple processor 30 and devices 36 together to provide selective bidirectional communication therebetween. In one variation of this form, the bus is coupled to processor 30 via an interface bridge (not shown). Philips Semiconductors model LPC2114 and model LPC2124 are nonlimiting examples of microcontroller configurations that include processors, interrupt control logic, I/O and various dedicated embedded devices of a type that could be included in microprocessor circuit 22.

Microcontroller 24 further includes waveform generation circuitry 40. Circuitry 40 includes waveform bit pattern storage memory 42 and waveform control logic circuitry 44 coupled to processor 30 by bus 38. Processor 30 has read/write access to memory 42. Memory 42 can be the same or different than other memory coupled to processor 30 for programming and/or processor data storage, and bus 38 can be the same or different than buses coupled to such processor memory, to interrupt control logic 32, to devices 36, or the like. Waveform logic 44 is operatively coupled to memory 42 to provide control thereof without adding appreciable traffic along bus 38. Waveform logic 44 includes at least one timer 46 that is synchronized to operation of processor 30 in a standard manner. For example, processor 30 and timer 46 can share a common clock and/or different time-base circuitry (not shown). Waveform logic 44 is responsive to input received from processor 30 via bus 38 to control certain aspects of waveform generation based on the pattern information stored in memory 42, as will be described in greater detail in connection with FIG. 2 hereinafter.

Microcontroller 24 also includes several shared input/output pins 48 more specifically designated pins P0, P1, . . . , and PN; where the variable "N" relates to the total N+1 number of pins. Each pin 48 is connected to a pin-level logical selection block 50 designated PIN SEL 0, PIN SEL 1, . . . , and PIN SEL N in FIG. 1, with the vertical ellipsis of FIG. 1 representing pin P2 through pin PN-1, and block PIN SEL 2 through block PIN SEL PN-1. Reference numerals 50a, 50b, and 50c are also provided referring more specifically to blocks PIN SEL 0, PIN SEL 1, and PIN SEL N; respectively.

Blocks 50 are each configured to select from among memory 42 and "x" number of pathways from other devices 36, where x is an integer value of at least one. Some, all, or none of the outputs of Block 42 may also be connected directly to the input/output pins. Selection, or "switching between" memory 42 and devices 36 is performed based on a selection bit input value stored in and provided from one of registers 34, as loaded by processor 30. While the arrowhead directions represent outgoing signals from other devices 36, it should be appreciated that one or more of these may be inputs through pins 48 for certain embodiments, where at least a portion of pins 48 are switchable between input and output operation. In one particular, nonlimiting embodiment, some or all of pins 48 are of a general purpose input/output type. Likewise, in other embodiments, some or all of pins 48 can be dedicated only to output. Alternatively or additionally, at least some of "x" number of pathways may be associated with memory or other arrangements besides devices 36 (not shown). Pins 48 correspond to terminals 52 of microcontroller circuit 22 that are more specifically designated terminals 52a, 52b, and 52c in correspondence to pins P0, P1, and PN. Pins 48 (terminals 52) are arranged to be coupled to circuitry and/or signal pathways external to microcontroller integrated circuit 22.

External to microcontroller circuit 22, bus 60 is coupled to pins 48 and circuit device 62. Bus 60 is also coupled to input data latch 70. Latch 70 is embedded in microcontroller integrated circuit 22. It should be appreciated that latch 70 could be included among devices 36; however, it is shown separately in FIG. 1 to preserve clarity. Furthermore, the input to latch 70 from bus 60 and/or device 62 can be provided via general purpose input/output pins or the like. Latch 70 also receives input from device 62. In one specific arrangement, device 62 includes a memory and bus 60 is utilized to strobe data into latch 70 from this external memory.

Figure 2:
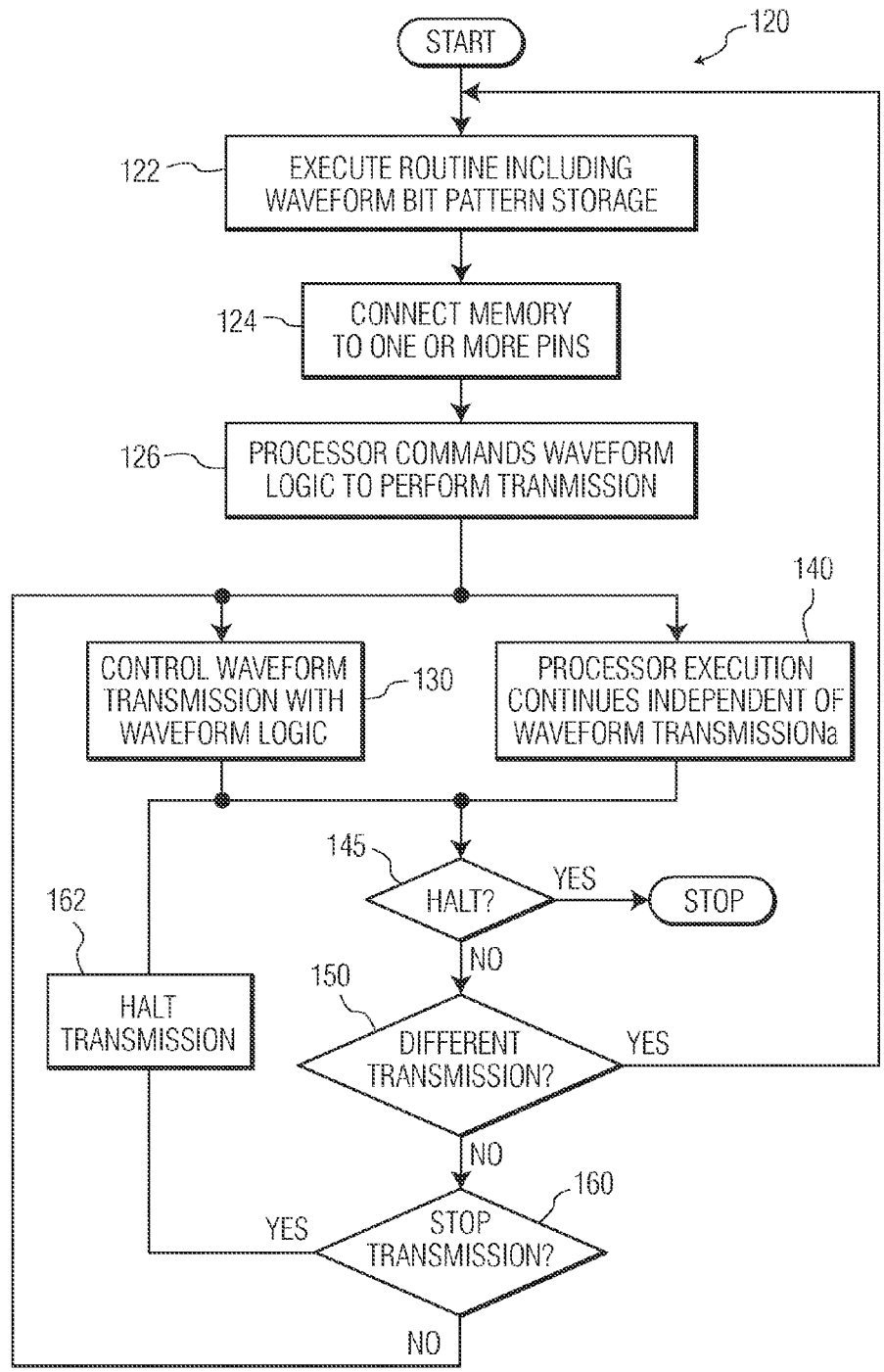
FIG. 2 is a flowchart corresponding to operation of the system of FIG. 1.

FIG. 2 depicts one type of operating procedure 120 for system 20 in flowchart form; where like reference numerals refer to like features previously described. Procedure 120 begins with operation 122. In operation 122, processor 30 executes programming, including a routine with a sequence of instructions that directs generation of a desired waveform over bus 60 through one or more of pins 48 with a desired timing/frequency relationship. Rather than directly generate this waveform from instructions as they are executed by processor 30, waveform generation circuitry 40 is utilized. Specifically, the routine executed by processor 30 directs storage of data in memory 42 via bus 38. This data provides a waveform bit pattern to be transmitted onto bus 60. In one nonlimiting application, this waveform bit pattern is selected to appropriately strobe data into latch 70 from device 62.

From operation 122, procedure 120 continues with operation 124, which further sets-up waveform generation. In operation 124, waveform generation set-up includes storage of selection data in one or more of registers 34 to select memory 42 with blocks 50 as an input source. Correspondingly, output from memory 42 through blocks 50 is provided to bus 60 via selected pins 48 (terminals 52). It should be appreciated, the selection blocks 50 can be used to vary the number of pins 48 receiving input from memory 42 in operation 124. Alternatively, this quantity can be fixed for a given embodiment.

From operation 124, operation 126 is performed. In operation 126, waveform logic 44 responds to input from processor 30 to initiate transmission of the waveform bit pattern from memory 42 through pins 48. This input could include one or more commands directing a number of aspects of the transmission, such as frequency or other transmission timing parameters. For example, the transmission could be specified as a "one time only" type or set to repeat. In one embodiment of the repeating type, microcontroller 24 can be arranged with a processor command structure recognized by waveform circuitry 44 that specifies a finite number of repetitions or that repetition be indefinite. Alternatively or additionally, processor 30 and waveform logic 44 can be arranged to provide a variable delay before starting transmission and/or repeating transmission. Waveform logic 44 utilizes timer 46 to control frequency and other timing aspects (if present), such that the waveform bit pattern transmission to bus 60 is synchronous, at least with respect to the operation of processor 30.

From operation 126, procedure 120 continues with operations 130 and 140 that at least partially overlap one another in time—typically being performed for the most part concurrently (i.e. in parallel). In operation 130, transmission of the waveform is performed under control of waveform logic 44. In parallel, processor 30 continues to execute a different segment or instruction sequence of the routine in operation 140 that may correspond to a different process or function as the waveform is independently transmitted by circuitry 40. In one particular form, the different process includes or is directed to servicing an interrupt in operation 140 as waveform generation continues in operation 130.

Procedure 120 continues with conditional 145 that tests whether to continue operation. If the test of conditional 145 is true (affirmative), procedure 120 halts. If the test of conditional 145 is false (negative), procedure 120 continues with conditional 150. It should be appreciated that the test of conditional 145 can be software and/or hardware driven such that it may come from the routine being executed by processor 30, or independent of it.

Conditional 150 tests whether to send a different waveform. If the test of conditional 150 is true (affirmative), procedure 120 loops back to operation 122 to store the next bit pattern for generation of a different waveform, and repeats operations 122, 124, 126, 130 and 140 for the new waveform. If the test of conditional 150 is false (negative), procedure 120 proceeds to conditional 160.

Conditional 160 tests whether to terminate waveform transmission. If the test of conditional 160 is true (affirmative), waveform transmission terminates in operation 162. In one embodiment, the waveform transmission termination of operation 150 is performed by waveform logic 44 without further input or direction via bus 38 and/or processor 30. In another embodiment, processor 30 provides one or more inputs via bus 38 that cause waveform logic 44 to terminate transmission. From operation 162, procedure 120 returns to conditional 145. If the test of conditional 160 is false (negative), procedure 120 returns to operation 130 and 140. It should appreciated that conditionals 150 and/or 160 could be implemented through programming of processor 30; however, such tests and results may be implemented through hardware input or otherwise as would be known to those skilled in the art.

Many other embodiments of the present application are envisioned. For example, the teachings of the present application can be applied in many different integrated circuit configurations. Another example includes providing an integrated circuit with a programmable processor, memory, waveform logic operatively coupled to the processor and the memory, and several terminals; controlling transmission of the waveform bit pattern stored in the memory through one or more of the terminals in accordance with designated timing; and during this transmission, executing an instruction sequence for a different process with the processor.

Still a further example includes an integrated circuit with a programmable processor, memory operatively coupled to the processor, waveform control circuitry operatively coupled to the processor and memory, and several terminals. The processor includes means for storing a waveform bit pattern in the memory in accordance with a first instruction sequence and executing a second instruction sequence for a different process during transmission of a waveform corresponding to the bit pattern under control of the waveform logic. The waveform logic includes means for controlling transmission of the waveform bit pattern stored in the memory through one or more of the terminals in accordance with desired timing.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
   providing a microcontroller integrated circuit including a programmable processor, an embedded memory operatively coupled to the processor, waveform control circuitry operatively coupled to the processor and the embedded memory, and several terminals each structured for coupling to the microcontroller integrated circuit;
   executing a process by the processor, including storing a waveform bit pattern in the embedded memory, wherein the processor has read/write access to the embedded memory;
   with the waveform control circuitry, controlling transmission of the waveform bit pattern stored in the embedded memory through one or more of the terminals external to the microcontroller integrated circuit in accordance with desired synchronous timing;
   during the transmission, executing an instruction sequence for a different process with the processor; and
   controlling input of information into the microcontroller integrated circuit from a circuit device external to the microcontroller integrated circuit in response to the transmission of the waveform bit pattern, wherein the waveform bit pattern is used to strobe the information into the microcontroller integrated circuit.

2. The method of claim 1, wherein the processor, the memory, and the waveform control circuitry are coupled to a common bus, wherein the processor directs storage of the waveform bit pattern in the embedded memory via the common bus.

3. The method of claim 1, which includes initiating the transmission with the waveform control circuitry in response to the processor.

4. The method of claim 1, which includes repeating the transmission of the waveform bit pattern in response to the programming executed by the processor.

5. The method of claim 1, wherein the different process includes servicing an interrupt with the processor.

6. The method of claim 1, which includes selecting the one or more of the output terminals in accordance with a value stored in one or more registers by the processor.

7. The method of claim 1, wherein the terminals are provided as general purpose input/output pins, which includes selectively switching each of the input/output pins between the memory and one or more other embedded devices.

8. Apparatus, comprising: a microcontroller integrated circuit device including:
   an embedded memory;
   waveform control circuitry operatively coupled to the embedded memory;
   several terminals each structured to provide a connection external to the microcontroller integrated circuit; and
   a programmable processor configured to execute a first sequence of instructions to store a waveform bit pattern in the embedded memory with a desired transmission timing, the waveform control circuitry being responsive to the programmable processor to control synchronous transmission of the waveform bit pattern stored in the embedded memory through one or more of the terminals in accordance with the desired timing while the processor executes a second sequence of instructions to perform a different process with the processor;
   wherein the processor has read/write access to the embedded memory;
   wherein the microcontroller integrated circuit is configured to receive input data from a circuit device external to the microcontroller integrated circuit in response to the waveform bit pattern, wherein the waveform bit pattern is used to strobe the input data into the microcontroller integrated circuit.

9. The apparatus of claim 8, wherein the processor, the memory, and the waveform control circuitry are coupled to a common bus, wherein the processor directs storage of the waveform bit pattern in the embedded memory via the common bus.

10. The apparatus of claim 8, wherein the terminals are each a shared general input/output pin and the microcontroller integrated circuit includes one or more other embedded devices and one or more registers operable to selectively switch each of the terminals between the embedded memory and the one or more other embedded devices.

11. The apparatus of claim 8, wherein the waveform control circuitry includes a timer synchronized to instruction execution by the processor.

12. The apparatus of claim 8, wherein the microcontroller integrated circuit includes means for servicing an interrupt during performance of the different process.

13. A method, comprising:
   providing a microcontroller integrated circuit including a programmable processor, an embedded memory operatively coupled to the processor, waveform control circuitry operatively coupled to the processor and the embedded memory, and several input/output pins, the input/output pins each being structured to be selectively switched between the embedded memory and at least one different embedded device, wherein the processor has read/write access to the embedded memory; and
   executing a first instruction sequence with the processor;
   wherein execution of the first instruction sequence directs storage of a waveform bit pattern in the embedded memory;
   the waveform control circuitry initiating transmission of the waveform bit pattern stored in the embedded memory through one or more of the input/output pins and controlling timing of the transmission;
   executing a second instruction sequence with the processor during the transmission, the transmission being under control of the waveform control circuitry; and
   controlling input of information into the microcontroller integrated circuit from a circuit device external to the microcontroller integrated circuit in response to the transmission of the waveform bit pattern, wherein the waveform bit pattern is used to strobe the information into the microcontroller integrated circuit.

14. The method of claim 13, which includes repeating the transmission of the waveform bit pattern during the executing of the second instruction sequence.

15. The method of claim 13, wherein the executing of the second instruction sequence includes servicing an interrupt with the processor.

16. The method of claim 13, which includes selecting the one or more of the input/output pins in accordance with a value stored in a register by the processor.

17. Apparatus, comprising:
   a microcontroller integrated circuit device including: an embedded memory;
   waveform control circuitry operatively coupled to the embedded memory;
   several input/output pins, the input/output pins being structured to each be selectively switched between the embedded memory and at least one different embedded device; and
   a programmable processor including means for executing a first sequence of instructions to store a waveform bit pattern in the embedded memory and designate timing for the waveform bit pattern, wherein the processor has read/write access to the embedded memory;
   wherein the waveform control circuitry includes means for controlling synchronous transmission of the waveform bit pattern stored in the embedded memory through one or more of the input/output pins in accordance with the timing while the processor executes a second sequence of instructions to perform a different process with the processor; and
   wherein the microcontroller integrated circuit is configured to receive input data from a circuit device external to the microcontroller integrated circuit in response to the waveform bit pattern, wherein the waveform bit pattern is used to strobe the input data into the microcontroller integrated circuit.

* * * * *